(12) United States Patent
Meliksetian et al.

(10) Patent No.: US 8,386,407 B2
(45) Date of Patent: Feb. 26, 2013

(54) METHOD AND APPARATUS FOR GENERATING CONTEXT-AWARE GENERIC WORKFLOW APPLICATIONS

(75) Inventors: Dikran S. Meliksetian, Southbury, CT (US); Zhi Jun Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 848 days.

(21) Appl. No.: 12/486,225

(22) Filed: Jun. 17, 2009

(65) Prior Publication Data
US 2010/0010953 A1 Jan. 14, 2010

(30) Foreign Application Priority Data
Jul. 11, 2008 (CN) .......................... 2008 1 0130341

(51) Int. Cl.
G06F 17/30 (2006.01)
G06F 7/10 (2006.01)
(52) U.S. Cl. .............. 706/47; 706/46; 707/756
(58) Field of Classification Search ............ 706/47
See application file for complete search history.

(56) References Cited

PUBLICATIONS

Furnari et al., Context-Aware Workflow Management [online], 2007 [retrieved on Mar. 21, 2012]. Retrieved from the Internet: <URL:http://citeseerx.ist.psu.edu/viewdoc/summary?doi=10.1.1.146.3718>.*
Daniele, Towards a Rule-based Approach for Context-Aware Applications[online], 2006 [retrieved on Mar. 22, 2012]. Retrieved from the Internet<URL:http://essay.utwente.nl/59386/1/scriptie_L_Daniele.pdf>.*
Ardissono et al., Context-Aware Workflow Management [online], 2007 [retrieved on Mar. 21, 2012]. Retrieved from the Internet: <URL:http://citeseerx.ist.psu.edu/viewdoc/summary?doi=10.1.1.146.3718>.*
Daniele, Towards a Rule-based Approach for Context-Aware Applications[online], 2006 [retrieved on Mar. 22, 2012]. Retrieved from the Internet<URL:http://www.sciweavers.org/publications/towards-rule-based-approach-context-aware-applications>.*
Jun Li et al., "FollowMe: On Research of Pluggable Infrastructure for Context-Awareness", Proceedings of the 20th International Conference on Advanced Information Networking and Applications (2006).
E. Goh et al., "A Context-Aware Architecture for Smart Space Environment", 2007 International Conference on Multimedia and Ubiquitous Engineering (2007).

(Continued)

Primary Examiner — Jeffrey A Gaffin
Assistant Examiner — Nathan Brown, Jr.
(74) Attorney, Agent, or Firm — Law Offices of Ira D. Blecker, P.C.

(57) ABSTRACT

A method and apparatus for generating context-aware generic workflow applications is provided. The apparatus comprises: one or more generic workflow functional modules deployed on one or more workflow nodes of a workflow; a context-aware configuration storage device configured to store context-aware configuration data including context-aware logics; a context obtaining module configured, in response to the execution of the workflow on a workflow node, to obtain the current context of the workflow execution; a context-aware logic management module configured to retrieve context-aware logics matching the current context in the context-aware configuration data stored in the context-aware configuration storage device; wherein a relevant workflow functional module in the one or more generic workflow functional modules is configured to execute relevant operations according to the matched context-aware logics, thus generating a context-aware generic workflow application. The apparatus and method of the invention can generate generic workflow applications applicable to various workflows and contexts, which saves the developing and testing costs of workflow applications.

25 Claims, 5 Drawing Sheets

PUBLICATIONS

Theodore Patkos, "A Semantics-based Framework for Context-Aware Services", 4th International Conference on Ubiquitous Intelligence and Computing (UIC-07).

Seng W. Loke, "Context-Aware Artifacts: Two Development Approaches", Pervasive Computing (2006).

Marco Repetto et al., "A Design Tool to Develop Agent-Based Workflow Management Systems" (2003).

Oumaima Saidani et al., "Towards Context Aware Business Process Modelling" (2007).

L. Luo et al., "A context-aware small-call-center solution: Improving customer service for online games", IBM Systems Journal, vol. 45, No. 1 (2006).

* cited by examiner

Worklist > Worklist Contents > Generic

Generic

Document Functions

| ReceiptDate | UniqueID |
|---|---|
| _____ * | Index2 |
| BatchID | |
| _____ | |
| LegalEntity | *D_ERPSysID |
| Index2 | PC2 |
| ERPDocNo | ImportDocType |
| _____ | _____ |
| ReasonCode | HistoryLog |
| _____ | _____ |
| A_LookupP2 | ApproverStatus |
| _____ | _____ * |
| RequesterTimeStamp | ApproverUserID |
| 2007-08-09-14.55.34.6 | Ashley |
| RequesterName | |
| _____ | |
| SupplierName | PONo |
| _____ | _____ * |

Process Options

[VendorReq] [Query] [Rescan] [Support] [Send for Approval]

[Apply] [Back]

FIG. 2

Worklist > Worklist Contents > Generic

Generic

[Document Functions]

LegalEntity　　　　　　　　　　　　　　*D_DocID
[          ]*🔍　　　　　　　　　　　　[docID          ]🔍

RequesterTimeStamp
[          ]*

InvNo
[12        ]

LineItem1

| + | Line# | A_ActualA0 | | 'A_AppNm4 | |
|---|---|---|---|---|---|
| − | 1 | 1 | * | 81 | 🔍 |
| − | 2 | zoujian | * | yingweiz | 🔍 |

F_AccountCode

| + | Line# | LineNo | |
|---|---|---|---|
| − | 1 | 41 | 🔍 |

── Process Options ──────────────────────────────
[VendorReq]　[Query]　[Rescan]　[Support]　[Send for Approval]

[Apply] [Back]

FIG. 3

Worklist > Worklist Contents > Generic

Generic

▼ Vendor

ReceiptDate [    ] *

UniqueID [Index2]

BatchID [    ]

▼ Document

LegalEntity [Index2]

ERPDocNo [    ]

ReasonCode [    ]

*D_ERPSysID [PC2]

ImportDocType [    ]

HistoryLog [    ]

▼ Approval

A_LookupP2 [    ]

RequesterTimeStamp [2007-08-09-14.55.34.6]

RequesterName [    ]

ApproverStatus [    ] *

ApproverUserID [Ashley]

▼ Others

SupplierName [    ]

PONo [    ] *

[Document Functions]

―Process Options―

[VendorReq] [Query] [Rescan] [Support] [Send for Approval]

[Apply] [Back]

FIG. 4

METHOD AND APPARATUS FOR GENERATING CONTEXT-AWARE GENERIC WORKFLOW APPLICATIONS

TECHNICAL FIELD

The invention relates to the data processing field, specifically to workflow applications, and more specifically to a method and apparatus for generating context-aware generic workflow applications.

BACKGROUND OF THE INVENTION

Workflow technologies are being more and more widely used. Many enterprises are developing new workflows, or renewing current workflows to adapt them to new service conditions.

A workflow refers to partial or total automation of a business process, in which documents, information or tasks are transferred from one participant to another to be processed according to a set of procedural rules. A workflow is defined, created, operated and managed by a workflow management system. Different workflow management systems have different structures, but in general, include three parts as follows: a workflow defining component for defining workflows, for instance, modelling a workflow by using GUI modelling tool, and deploying the workflow definition into a workflow engine; the workflow engine for interpreting the workflow definition, creating, managing and operating a workflow instance, and during the process, interacting with participants and workflow applications of the workflow; a set of workflow applications for interacting with the workflow engine through APIs provided by the workflow engine, for instance, obtaining and processing a work item, and providing the processing result to the workflow engine, etc.

In the current technology (i.e. BPC Explorer and FileNet BPM of IBM), workflow applications and the workflow itself are tightly coupled with each other. Whenever a new workflow is defined, a new set of workflow applications are required to be developed for the workflow definition. Whenever a current workflow definition is changed, it is required to redevelop or revise part or all of the original set of workflow applications. However, the developing of workflow applications is very hard work. For example, generally speaking, for almost every manual step in workflow applications, several web pages are required to be developed. Provided that an enterprise possesses 10 workflows, each of which contains 10 manual steps, the workload of developing and testing will be huge. Besides, the changing of business is common for enterprises. If it is a must to redevelop or revise workflow applications whenever business is changed, the changing of business will be found hard for developing and testing teams to catch up with.

In addition, even for the same given workflow there may exist requirements as follows:

Different users shall see different information, for example, the managers are able to see employees' salary, while the employees shall not see other employees' salaries;

In different workflow stages, different information shall be seen, for example, the first approver only needs to know request content, while the second approver also needs to know the identity of the first approver;

Different functions require different information, for example, for a data input function, most fields in the user interface shall be editable, while for an approving function, most fields shall be solely for displaying;

Different types of work items in a specific function require different actions, for example, for an invoice based on a purchase order, the system has to check the relevant purchase order in an ERP system, while for a invoice not based on a purchase order, the system does not need the action;

Different conditions determine different actions, for example, after the work item has been approved by the first approver, system shall send e-mail to the next approver, while after the work item has been approved by the last approver, there is no need to send e-mail to the next approver.

In current technology, for each of the different situations, for example, different users, different workflow stages, different functions, different types of work items and different conditions, different workflow applications are required to be developed, and a generic workflow application capable of being adapted to all the different situations cannot be developed, let alone the generic workflow application which is adapted to not only different situations of a same workflow but also different workflows, thus causing heavy developing and testing workload.

A method for designing, developing or generating a generic workflow application and capable of largely reducing developing and testing workload is needed in the field.

BRIEF SUMMARY OF THE INVENTION

In one aspect of the invention, a method for generating context-aware generic workflow applications is provided. The method comprises: developing one or more generic workflow functional modules, and deploying the one or more generic workflow modules to one or more workflow nodes of a workflow; creating and storing context-aware configuration data containing context-aware logics; in response to the execution of the workflow on a workflow node, obtaining the current context of the workflow execution; retrieving context-aware logics matching the current context in the stored context-aware configuration data; and executing relevant operations by a relevant workflow functional module in the one or more generic workflow functional modules according to the matched context-aware logics, thus generating a context-aware generic workflow application.

In another aspect of the invention, an apparatus for generating context-aware generic workflow applications is provided, comprising: one or more generic workflow functional modules deployed on one or more workflow nodes of a workflow; a context-aware configuration storage device configured to store context-aware configuration data including context-aware logics; a context obtaining module configured, in response to the execution of the workflow on a workflow node, to obtain the current context of the workflow; a context-aware logic management module configured to retrieve context-aware logics matching the current context in the context-aware configuration data stored in the context-aware configuration storage device; wherein a relevant workflow functional module in the one or more generic workflow functional module is configured to execute relevant operations to the matched context-aware logics, thus generating a context-aware generic workflow application.

In another aspect of the invention, computer program product comprising: a computer recordable medium having computer usable program code for generating context-aware generic workflow applications comprising: computer usable program code configured for obtaining a current context of the workflow execution in response to an execution of a workflow on a workflow node; computer usable program code configured for retrieving context-aware logics matching the current context from a stored context-aware configuration data including context-aware logics; and computer usable program code configured for executing relevant operations by a generic workflow functional module deployed on the workflow node of the workflow according to the matched context-aware logics, and generating a context-aware generic workflow application.

In yet another aspect of the invention, a computer readable storage medium storing instructions that, when executed by a computer, causes the computer to perform a method for generating context-aware generic workflow applications, the method comprising the steps of: obtaining a current context of the workflow execution in response to an execution of a workflow on a workflow node; retrieving context-aware logics matching the current context from a stored context-aware configuration data including context-aware logics; and executing relevant operations by a generic workflow functional module deployed on the workflow node of the workflow according to the matched context-aware logics, and generating a context-aware generic workflow application.

The advantages of the invention include: largely reducing developing and testing workload; capable of being adapted to business changes by changing configuration instead of changing code to be adapted to changes more rapidly with low cost; and being able to develop workflow function with no need of being aware of a customer's specific workflow.

BRIEF DESCRIPTION OF THE DRAWINGS

Inventive features regarded as characteristic of the invention are set forth in the attached claims, however, the invention itself, and the preferable use mode, further objectives, characteristics and advantages thereof can be better understood by referring to the detailed description of illustrative embodiments below when read in conjunction with the drawings, in which:

FIG. 2 illustrates a schematic user interface generated by the apparatus for generating context-aware generic workflow applications according to an embodiment of the invention based on a context-aware configuration table;

FIG. 3 illustrates another schematic user interface generated by the apparatus for generating context-aware generic workflow applications according to an embodiment of the invention according to a context-aware configuration table;

FIG. 4 illustrates another schematic user interface generated by the apparatus for generating context-aware generic workflow applications according to an embodiment of the invention according to a context-aware configuration table and other database tables.

DETAILED DESCRIPTION OF THE INVENTION

The invention generates a context-aware generic workflow application by introducing context-aware logics into a generic workflow function. The workflow application can meet most requirements and have wide application.

Embodiments of the invention will be described by referring to the appended figures. In the following description, numerous specific details are set forth in order for the invention to be more fully understood. However, it is apparent to those skilled in the art that the implementation of the invention may not have those specific details. In addition, it shall be understood that the invention is not limited to the described specific embodiments. On the contrary, it is contemplated that the invention can be implemented by using any combination of the following features and elements, no matter whether they involve different embodiments or not. Therefore, the following aspects, characteristics and embodiments and advantages are for illustration purpose only, and shall not be regarded as elements or limitations of the attached claims, unless being explicitly stated in the claims.

Figure 1:
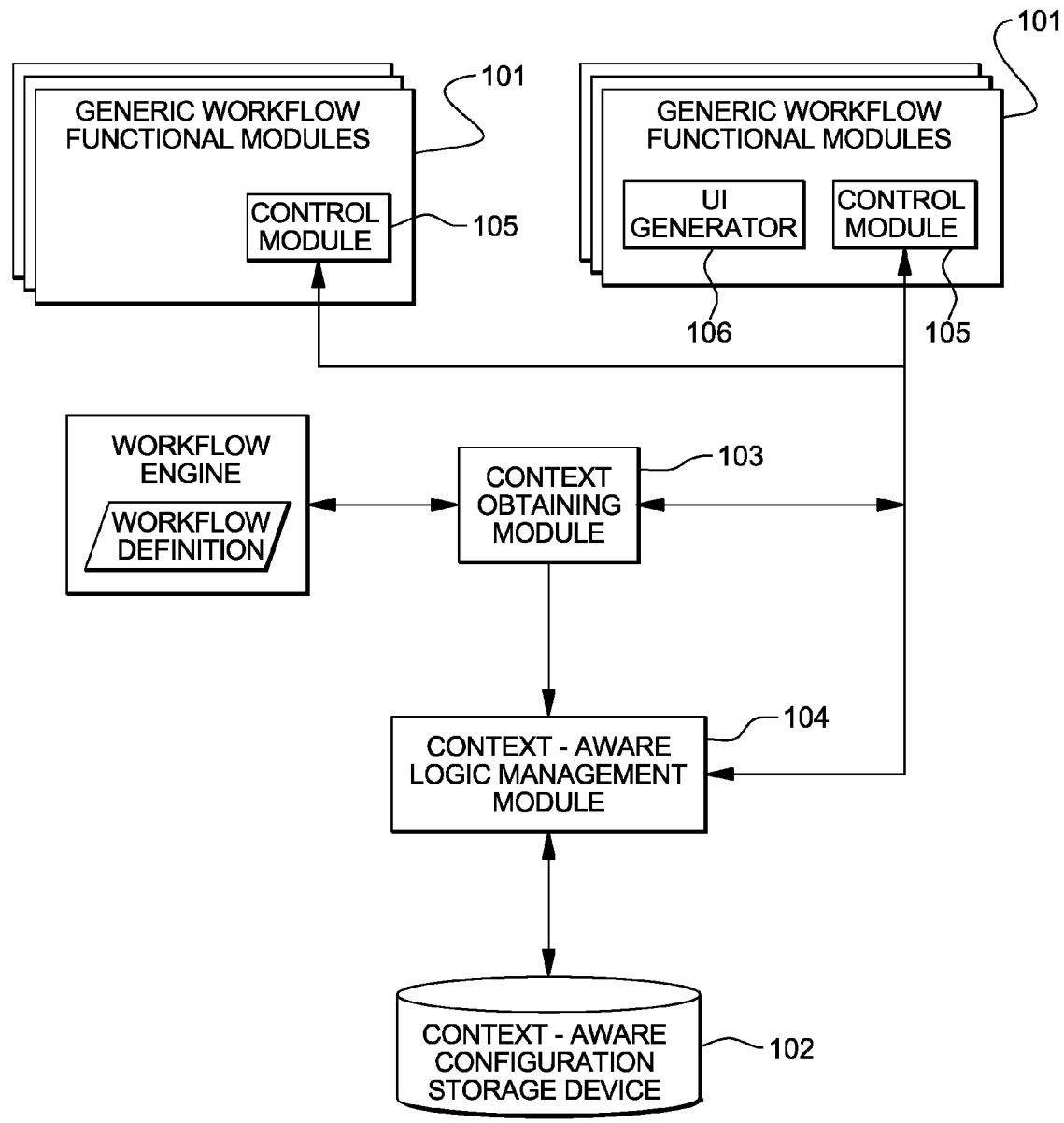
FIG. 1 illustrates an apparatus for generating context-aware generic workflow applications according to an embodiment of the invention.

FIG. 1 illustrates an apparatus for generating context-aware generic workflow applications according to an embodiment of the invention. As illustrated, the apparatus comprises: one or more generic workflow functional modules 101 deployed on one or more workflow nodes or steps of a workflow; a context-aware configuration storage device 102 configured to store context-aware configuration data containing context-aware logics; a context obtaining module 103 configured, in response to the execution of the workflow on a workflow node, to obtain the current context of the workflow execution; a context-aware logic management module 104 configured to retrieve context-aware logics matching the current context from the context-aware configuration data stored in the context-aware configuration storage device 102; wherein a relevant workflow functional module 101 in the one or more generic workflow functional modules 101 is configured to execute relevant operations according to the matched context-aware logic so as to generate a context-aware generic workflow application.

The context-aware configuration storage device 102 can be any type and form of storage device.

The context obtaining module 103 and context-aware logic management module 104 both can be implemented either in each generic workflow functional module 101, or outside the generic workflow functional module 101.

According to an embodiment of the invention, the context-aware logic includes a set of context-aware conditions and corresponding context-aware actions, wherein the context-aware logics matching the current context are the context-aware logics containing a set of context-aware conditions matching the current context, and executing relevant operations according to the matched context-aware logics is executing the corresponding context-aware actions according to matched context-aware conditions.

According to an embodiment of the invention, each of the set of context-aware conditions includes any one or more of the following: a generic workflow function; a workflow node; a user group; a work item type; and a rule to be met for executing the context-aware actions. According to other embodiments of the invention, the context-aware conditions may also include other contents, for example, other attributes of the work item or the workflow, and environment variables for running the workflow, such as the current time, etc.

According to an embodiment of the invention, the rule includes any one of the followings: a work item/workflow attribute name/attribute value pair; a boolean expression about a work item/workflow attribute(s). According to other embodiments of the invention, the rule may also include other contents; for example the rule may include a SQL query statement against a configuration database table when the current context-aware logics are stored in the context-aware configuration database as described below.

According to an embodiment of the invention, each of the set of corresponding context-aware actions includes any one or more of the following: displaying a specific work item/workflow attribute in a user interface (UI) and the displaying manner thereof; and processing a specific work item/workflow attribute and the processing manner thereof.

According to an embodiment of the invention, the context-aware configuration data is stored in the context-aware configuration storage device 102 in the form of a database table or an XML file or a file of other formats. According to a specific implementation of the invention, when the context-aware configuration data is stored in the form of a database table, each table entry of the database table is used for defining a context-aware logic which contains context-aware conditions and a context-aware action for displaying or processing a work item attribute or workflow attribute. Of course, this is not a limitation to the invention; and each table entry in the database table may also include a context-aware logic for displaying or processing multiple work item attributes or workflow attributes.

As stated above, in an embodiment of the invention, the context-aware logic may include contents as follows:

When—which function will be invoked currently? For example, a data input function or approval function, etc.

Where—which stage or step of workflow the work item is in, or which workflow node the work item is in currently;

Who—which user attempts to execute the function;

What—which type of work item is being processed;

Why—under what conditions the user or workflow application can execute the operation;

How—how to process, organize or display the information of the work item?

Wherein, the contents of when, where, who, what and why belong to the context-aware conditions, while the contents of how belong to the context-aware action.

The following table illustrates an exemplary structure of the context-aware configuration database table for defining the context-aware logics according to an embodiment of the invention.

| Field Name | Type | Length | Description |
| --- | --- | --- | --- |
| FUNCTION | VARCHAR | 32 | Name of a generic workflow function, for example, a data input function, an approval function, etc. |
| ITEMTYPENAME | VARCHAR | 32 | Type of the processed work item. If the field is null, it means that the context-aware logic expressed by the table entry is applicable to all types of work items. |
| Workflow Stage | VARCHAR | 32 | Name of the current workflow stage or workflow node. If the field is null, it means that the context-aware logic expressed by the table entry is applicable to all workflow stages; for example, the work item attribute expressed by the DISPLAYFIELDNAME field will be displayed on the user interfaces in all workflow stages. |
| USERGROUP | VARCHAR | 32 | Only the users belonging to this user group are suitable for the context-aware logic expressed by the table entry; for example, they can view the work item attribute expressed by the DISPLAYFIELDNAME field. When the field is null, it means that all users are suitable for the context-aware logic expressed by the table entry; for example, they can view the work item attribute expressed by the DISPLAYFIELDNAME field. |
| Rule | VARCHAR | 256 | The value specifies the conditions for applying the table entry, for example, the conditions for determining whether the work item attribute expressed by the DISPLAYFIELDNAME shall appear in a user interface. The conditions can be, for example, either a boolean expression or a KeyName/KeyValue pair, wherein the KeyName denotes a specific attribute name of the work item or workflow. When the condition is expressed in the form of KeyName/KeyValue pair, the Rule field can also be divided into two fields, KeyName and KeyValue. If the field is null, it means that the context-aware logic expressed by the table entry contains no rule constraints. |
| DISPLAYFIELD-NAME | VARCHAR | 32 | The work item/workflow attribute to be displayed or processed in the workflow function |
| PROCESSINGFLAG | Char | 1 | The field is used to specify how to process the work item/workflow attribute expressed by the DISPLAYFIELDNAME field. For different workflow functions, the field may have different sets of values. For example, for a workflow function with a user interface, the field may has the following values:<br>D—For displaying only<br>M—Mandatory<br>O—Optional |
| SEQUENCE | INTEGER | 1 | Processing sequence of the work item/workflow attribute expressed by the DISPLAYFIELDNAME field. The value of the SEQUENCE field also can be a two-tuple for generating a complex user interface; for example, (2, 1) shows that the displaying sequence of the attribute expressed by the DISPLAYFIELDNAME field in a user interface is the second in the vertical direction and the first in the horizontal direction. |

Because for the same DISPLAYFIELDNAME, there may be multiple table entries, the values of PROCESSINGFLAG may have sequence, for example, D>M>O. In addition, some policy may be implemented to specify the processing sequence of multiple table entries containing a same DISPLAYFILEDNAME value. For example, a table entry with more matching conditions will have higher priority; a table entry with a smaller line number will have higher priority; if two table entries have a same number of matching conditions, it can be specified that rule matching has higher priority than workflow node name matching, etc.

In a specific implementation of the invention, if any field in a table entry of the context-aware configuration database table is null, it shows that there is no restriction for the table entry in the field, namely the table entry can match any value of a relevant current context in the workflow execution. Of course, this is not a limitation to the invention.

An exemplary context-aware configuration database table in compliance with the above exemplary table structure and for defining the context-aware logics for a specific workflow application is illustrated in the following.

data input functions in different stages of a same workflow, and comprises the following logics: obtaining the current context of the workflow execution, finding context-aware logics matching the current context in the context-aware configuration storage device 102, executing relevant context-aware actions in the matched context-aware logics, for example creating and displaying relevant work item attribute fields in a user interface, and processing data update to work item attribute fields performed by the user, for example transferring it to the workflow engine. As another example, a generic workflow functional module 101 for approval can be used for approval functions in various existing or future workflows and/or approval functions of different stages of the same workflow, and comprises the following logics: obtaining the current context of the workflow execution, finding context-aware logics matching the current context in the context-aware configuration storage device 102, executing relevant context-aware actions in the matched context-aware logics, for example creating and displaying relevant work

| Function | ItemType Name | Workflow Stage | KeyName | Key Value | DISPLAYFIELD NAME | Processing-Flag | UserGroup | Sequence |
|---|---|---|---|---|---|---|---|---|
| Generic | COCE_AP_04 | IndexNode | D_SiteID | Site1 | ReceiptDate | M | UserGroup1 | 1 |
| Generic | COCE_AP_04 | IndexNode | D_SiteID | Site1 | UniqueID | O | UserGroup1 | 2 |
| Generic | COCE_AP_04 | IndexNode | D_SiteID | Site1 | BatchID | O | UserGroup1 | 3 |
| Generic | COCE_AP_04 | IndexNode | | | LegalEntity | O | UserGroup1 | 4 |
| Generic | COCE_AP_04 | IndexNode | D_SiteID | Site1 | D_ERPSysID | O | UserGroup1 | 5 |
| Generic | COCE_AP_04 | IndexNode | D_SiteID | Site1 | ERPDocNo | O | UserGroup1 | 6 |
| Generic | COCE_AP_04 | IndexNode | | | ImportDocType | D | UserGroup1 | 7 |
| Generic | COCE_AP_04 | IndexNode | D_SiteID | Site1 | ReasonCode | O | UserGroup1 | 8 |
| Generic | COCE_AP_04 | IndexNode | | | HistoryLog | O | UserGroup1 | 9 |
| Generic | COCE_AP_04 | IndexNode | D_SiteID | Site1 | A_LookupP2 | O | UserGroup1 | 10 |
| Generic | COCE_AP_04 | IndexNode | D_SiteID | Site1 | ApproverStatus | M | UserGroup1 | 11 |
| Generic | | IndexNode | | | RequesterTimeStamp | D | UserGroup1 | 12 |
| Generic | COCE_AP_04 | IndexNode | | | ApproverUserID | O | UserGroup1 | 13 |
| Generic | COCE_AP_04 | IndexNode | | | RequesterName | O | UserGroup1 | 14 |
| Generic | COCE_AP_04 | IndexNode | D_SiteID | Site1 | SupplierName | D | UserGroup1 | 15 |
| Generic | COCE_AP_04 | IndexNode | | | PONo | M | UserGroup1 | 16 |
| Generic | COCE_AP_ZJ | IndexNode | | | LineItem1 | O | UserGroup1 | 1 |
| Generic | COCE_AP_ZJ | IndexNode | | | LegalEntity | M | UserGroup1 | 2 |
| Generic | COCE_AP_ZJ | IndexNode | | | InvNo | O | UserGroup1 | 3 |
| Generic | COCE_AP_ZJ | IndexNode | | | D_DocID | O | UserGroup1 | 4 |
| Generic | COCE_AP_ZJ | IndexNode | | | F_AccountCode | O | UserGroup1 | 5 |

According to an embodiment of the invention, each of the one or more generic workflow functional modules 101 comprises generic logics for a specific function, which are applicable to multiple workflows and/or different contexts in a same workflow execution. For example, a generic workflow functional module 101 for data inputting can be used for data input functions in various existing or future workflows and/or item attribute fields in a user interface, and processing an approval operation to the work item performed by the user, for example transferring the ID of the current user and the current timestamp to the workflow engine.

An exemplary pseudo-code in a generic workflow functional module 101 is illustrated as follows:

```
Reading each table entry from the context-aware configuration table with the
above structure
Obtaining current context information:
(1) Obtaining the workflow stage of the current work item
(2) Obtaining the type of the current work item
(3) Finding the current user for processing the work item
(4) Obtaining each attribute name/attribute value pair in the work item
Matching the data obtained in the above step (1), (2), (3), (4) with the relevant
read data of each table entry, and if the matching is successful, displaying the work
item attribute specified by the DISPLAYFILEDNAME field in a user interface in the
manner as specified by the DISPLAYFLAG field in the matching table entry.
After the user inputs information into a work item attribute displayed in the
user interface, and submits the information, the specified actions are executed, for
example, only updating a work item attribute modified by the user or performing
some other updating, such as writing an audit record, etc.
```

It should be noted that the logics in the generic workflow functional module 101 as described above are only examples, and not a limitation to the invention. In another specific implementation of the invention, the generic workflow functional module 101 may also have other logics, for example, displaying some operation buttons according to the definition of the workflow, etc; or may not include some of the logics. And some of the logics, for example, those of obtaining the current context information and reading logics of table entries in the context-aware configuration table may be outside the generic workflow functional module. Provided only the generic workflow functional module 101 is capable of executing relevant operations according to the current context of the workflow execution and matched context-aware logics, any variations are within the spirit and scope of the invention.

As an example, if the current context of a workflow execution on a workflow node is as follows:

ItemType of the current work item is COCE_AP_04;
The value of the attribute D_Site in the current work item is Site1;
The current workflow node or step is IndexNode;
The current user belongs to UserGroup1;
The name of the workflow function on the current workflow node is Generic, then, the generic workflow functional module named Generic (for example, containing the pseudo-code as described above) on the current workflow node, through obtaining the current context of the workflow execution, matching the current context with the exemplary context-aware logics in the context-aware configuration table as described above, and performing the relevant context-aware actions, can generate a schematic user interface as illustrated in FIG. 2. And Generic generic workflow functional module will perform appropriate processing after the user inputs data into the user interface and submits or performs other operations.

As another example, if the current context of the workflow execution on a workflow node is as follows:

ItemType of the current work item is COCE_AP_ZJ;
The current workflow node or step is IndexNode;
The current user belongs to UserGroup1;
The workflow function on the current workflow node is Generic, Then, the workflow functional module named Generic (for example, containing the pseudo-code as described above) on the current workflow node, through obtaining the current context of the workflow execution, matching the current context with the exemplary context-aware configuration logics in the above table, and executing the relevant context-aware actions, can generate the schematic user interface as illustrated in FIG. 3. And Generic generic workflow functional module will perform appropriate processing after the user inputs data into the user interface and submits or performs other operations.

It should be noted that the structure of the context-aware configuration table is only an example, and not a limitation of the invention. The invention can employ a context aware configuration table with other structures and contents. Only by way of example, context-aware logics in a context-aware configuration table can specify displaying different workflow application names in a user interface in different contexts, for example, specifying that the name of a generic workflow function displayed on a user interface on a workflow node for handling unexpected conditions is Exception Handler, while the name displayed on the user interface on a workflow node for indexing is Index, which can be realized by setting a workflow application name field in a context-aware configuration table, for example. Context-aware logics in another context-aware configuration table can specify displaying different user interface appearances in different contexts. For example, the user interface of an emergency work item can use a brighter colour, while a common priority work item can use a normal colour, which can be realized by setting a colour field in a context-aware configuration table, for example. In summary, the context-aware configuration table may have any structure capable of expressing desired context-aware conditions and relevant desired context-aware actions.

The context-aware configuration table can be used for either one specific workflow or multiple workflows.

In addition, according to an embodiment of the invention, the foregoing context-aware configuration table can be used together with other database tables to generate more complex user interface, or to perform other more complex processing. For example, in addition to the exemplary context-aware configuration database table, the following two database tables can be defined:

| SectionDefinition Table Structure | |
|---|---|
| Field Name | Description |
| SectionID | Identifier of a section in a user interface, primary key of the table |
| Section Name | A section name displayed in a user interface, for example, "Document", "Approval", etc. |
| Section Sequence | The displaying sequence of a section in a user interface, which can be a two-tuple for arranging sections two-dimensionally |

| Field2SectionMap Table Structure | |
|---|---|
| Field Name | Description |
| SectionID | Identifier of the section to which an attribute field belongs, foreign key referring the SectionID field in the section table |
| Display Fieldname | Attribute field name displayed in a user interface, and the field refers DisplayFieldName field in the context-aware configuration table mentioned above. |
| FieldNameSeqInSection | Sequence of the attribute field in the section to which it belongs, which can be a two-tuple for arranging attribute fields in the section to which they belong two-dimensionally. |

By using a SectionDefinition table and a Field2SectionMap table with the above structures, as well as the context configuration database table mentioned above, a user interface containing sections, for example, a user interface containing Vendor, Document, Approval and Others sections as illustrated in FIG. 4, can be generated.

In addition, the apparatus of the invention not only can be used for generating a workflow application with user interfaces, but also can be used for generating a workflow application with no user interface. For example, a common requirement is that a workflow application should generate a report about a work item under some condition and send a notification to a third party under some condition. By using context-aware logics and a generic workflow function, such a workflow application can be realized flexibly.

The structure of a context configuration database table that can be used to realize the workflow application is illustrated in the following table:

| Field Name | Type | Length | Description |
|---|---|---|---|
| FUNCTION | VARCHAR | 32 | Name of a generic workflow function, for example, Current work item state report Approval notification, etc. |
| ITEMTYPENAME | VARCHAR | 32 | The value of the type of a work item in a workflow |
| WorkflowStage | VARCHAR | 32 | Workflow stage on which the workflow function runs. If the field is null, it means that the table entry is applicable to all workflow stages |
| Rule | VARCHAR | 256 | The value of the field specifies the conditions un which the table entry is applicable. The value of the field can be: a KeyName-KeyValue pair a boolean expression |
| DISPLAYFIELDNAME | VARCHAR | 32 | The work item/workflow attribute to be processed by the workflow function |
| PROCESSINGFLAG | Char | 1 | The field specifies how to process the work item/workflow attribute expressed by DISPLAYFIELDNAME. For different workflow applications, the field may have different sets of flags. For example, for workflow application with no user interface, the value of PROCESSINGFLAG can be: I—Identifier of the work item S—Status of the work item. |

For example, a generic workflow function named "GetStatus" is deployed on node 2 and node 4 of a workflow. The following table is a context-aware configuration database table for workflow applications in node 2 and node 4 of the workflow.

| Function | ItemType Name | Work Flow Stage | KeyName | KeyValue | DISPLAYFIELD NAME | Display Flag | User Group | Sequence |
|---|---|---|---|---|---|---|---|---|
| GetStatus | EmployeeRecord | Node 2 | EmployeeType | Regular | EmployeeEmail | I | | |
| GetStatus | EmployeeRecord | Node 2 | EmployeeType | Regular | EmployeeName | I | | |
| GetStatus | EmployeeRecord | Node 2 | EmployeeType | Regular | IsTakingVacation | S | | |
| GetStatus | EmployeeRecord | Node 2 | EmployeeType | Regular | DaysofVacation | S | | |
| GetStatus | EmployeeRecord | Node 4 | | | EmployeeEmail | I | | |
| GetStatus | EmployeeRecord | Node 4 | | | EmployeeName | I | | |
| GetStatus | EmployeeRecord | Node 4 | | | PerformanceRank | S | | |
| GetStatus | EmployeeRecord | Node 4 | | | Bonus | S | | |

GetStatus is the name of the generic workflow functional module 101, which will execute according to context-aware logics read from the context-aware configuration database table to obtain a relevant status from a work item, and output the obtained status to a text file. EmployeeRecord is a work item type, which means only this type of work item can be processed by GetStatus functional module 101. The GetStatus functional module 101 will be started up only on node 2 and node 4. On node 2, only when the value of EmployeeType attribute of the work item is "regular", can the GetStatus function be executed. When being outputted to a text file, EmployeeName and EmployeeEmail are regarded as the identifier of the work item, while IsTakingVacation and DaysofVacation are regarded as the status.

In this way, for example, when an employee is on leave, if the work item representing the employee passes through node 2 of the workflow, the content of the output file will be as follows:

EmployeeName=Tester
EmployeeEmail=tester@test.com

-continued

IsTakingVacation=Yes
DaysofVacation=10

Returning to FIG. 1, according to a further embodiment of the invention, the apparatus for generating context-aware generic workflow applications also comprises a control module 105. The control module 105 can either reside in each generic workflow functional module 101 as part thereof, or reside outside generic workflow functional modules 101 as a separate module. According to an even further embodiment of the invention, there is also a user interface generator 106 in each generic workflow functional module 101 with a user interface.

In an exemplary implementation of the invention, during the execution process of a workflow deployed on a workflow engine, when the workflow is executed on a workflow node, the generic workflow functional module 101 deployed on the node is started up, and the control module 105 inside or outside the generic workflow functional module 101 invokes the context obtaining module 103 to obtain the current context of the workflow execution. The context obtaining module 103 obtains the current context of the workflow execution by invoking the workflow engine and a user information repository, etc., and provides it to the control module 105. The control module 105 transfers the current context to a context-aware logic management module 104. The context-aware logic management module 104 uses the current context to retrieve matched context-aware logics in the context-aware configuration data structure 102, and transfers the context-aware actions included in the context-aware logics to the control module 105. For a generic workflow functional module 101 with a user interface, the control module 105 invokes a user interface generator 106 to execute the context-aware actions to generate and display a user interface related to the current context of the workflow execution, and thereafter performs relevantly processing on updating operations performed by the user in the user interface. For the generic workflow functional module 101 with no user interface, the control module 105 executes the context-aware actions by itself or through another functional component, to complete the operations relevant to the current context of the workflow execution. In a specific implementation of the invention, the controller is a Struts Action Servlet, the user interface generator is a JSP page, and the context-aware logic management module 104 is a Java class.

From the above description it can be seen that, a context-aware workflow application generated by the apparatus of the invention is loosely coupled with the workflow itself, therefore the workflow application is applicable not only to a specific workflow and a specific workflow context but also to various workflows and various workflow contexts, which means that it is generic. Only creating or modifying a relevant context-aware logic configuration file is needed, with no need of programming, to enable the apparatus of the invention to generate workflow applications applicable to multiple workflows and multiple workflow contexts, thus largely reducing the developing and testing costs of workflow applications.

The apparatus for generating context-aware workflow applications according to an embodiment of the invention has been described above by referring to the appended figures. It shall be noted that the description and illustration above are only exemplary, and are not a limitation to the invention. In other embodiments of the invention, the apparatus of the invention for generating context-aware workflow applications can have more, less or different modules, and the connection and containment relationships between modules can be different from that described and illustrated. For example, one or more of the context obtaining module 103, context-aware logic management module 104, control module 105 and UI generator 106 can either be used only for a single generic workflow module 101, or be shared by more or all generic workflow modules 101, etc. All these changes are within the scope of the invention.

A method for generating context-aware generic workflow applications according to an embodiment of the invention will be described below with reference to FIG. 5. The method can be implemented by the apparatus for generating context-aware workflow applications according to an embodiment of the invention as described above. For brevity, some contents that are the same as described above are omitted in the following description, therefore, the details of the method can be understood by referring to the above description.

Figure 5:
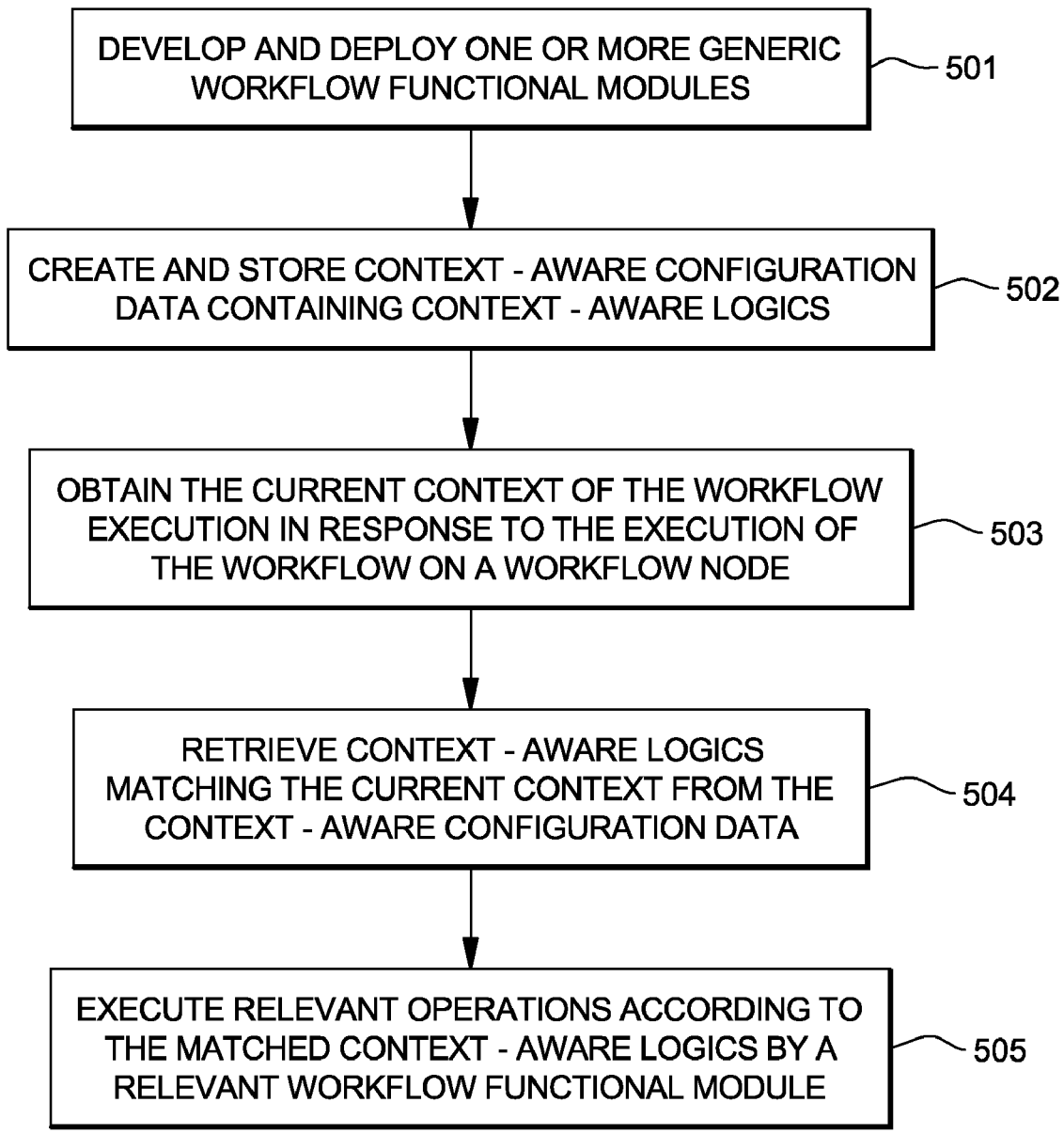
FIG. 5 illustrates a method for generating context-aware generic workflow applications according to an embodiment of the invention.

As illustrated in FIG. 5, in optional step 501, one or more generic workflow functional modules are developed and deployed onto one or more workflow nodes of a workflow.

In optional step 502, context-aware configuration data containing context-aware logics are created and stored.

In step 503, the current context of the workflow execution is obtained in response to the execution of the workflow on a workflow node.

In step 504, context-aware logics matching the current context are retrieved from the context-aware configuration data.

In step 505, a relevant workflow functional module in the one or more generic workflow functional modules executes relevant operations according to the matched context-aware logics, and thus generates a context-aware generic workflow application.

According to the embodiment of the invention, the context-aware logics contains a set of context-aware conditions and corresponding context-aware actions, the context-aware logics matching the current context is the context-aware logics containing a set of context-aware conditions matching the current context, and executing relevant operations according to the matched context-aware logics is executing the corresponding context-aware actions according to the matched set of context-aware conditions.

According to an embodiment of the invention, each of the set of context-aware conditions contains any one or more of the following: a generic workflow function, a workflow node, a user group, a work item type and a rule to be met for executing the context-aware actions.

According to the embodiment of the invention, the rule contains any one of the following items: a work item/workflow attribute name/attribute value pair, and a boolean expression about a work item/workflow attribute(s).

According to an embodiment of the invention, each of the set of corresponding context-aware actions includes one or more of the following: displaying a specific work item/workflow attribute in a user interface and the displaying manner thereof; and processing a specific work item/workflow attribute and the processing manner thereof.

According to an embodiment of the invention, the context-aware configuration data is stored in the form of a database table or a XML file.

According to an embodiment of the invention, each of the one or more generic workflow functional modules contains generic logics for specific function, which are applicable to multiple workflows and/or different contexts in a same workflow execution.

The method for generating context-aware generic workflow applications according to an embodiment of the invention having been described above, it shall be noted that the description is only exemplary, and not a limitation of the invention. In other embodiments of the invention, The method for generating context-aware generic workflow applications of the invention can have more, less or different steps, the sequences of some steps can be changed or they may be executed in parallel, and some steps can be divided into smaller steps or combined into greater steps. For example, in some embodiments of the invention, the optional steps 501 and 502 can be excluded, and the steps 503, 504 and 505 can also be combined into one step, etc. All these changes are within the spirit and scope of the invention.

The invention can be realized in hardware, software, or the combination thereof. The invention can be realized in one computer system in a centralized manner, or in a distributed manner, in which, different components are distributed among several inter-connected computer systems. Any computer system or other apparatus suitable for executing the method described herein is applicable. A typical combination of hardware and software may be a general-purpose computer system with a computer program, which, when being loaded and executed, controls the computer system to cause it to execute the method of the invention and constitutes the apparatus of the invention.

The invention also can be embodied in a computer programme product, which contains all the features enabling the realization of the method described herein, and when being loaded into a computer system, can execute the method.

Although the invention has been illustrated and described with reference to preferable embodiments, those skilled in the art can understand that the invention can be changed both in form and details without departing from the spirit and scope of the invention.

We claim:

1. A method for generating context-aware generic workflow applications, comprising:
   obtaining a current context of the workflow execution in response to an execution of a workflow on a workflow node;
   retrieving generic context-aware logics matching the current context from a stored context-aware configuration data including context-aware logics, the generic context-aware logics being specific to a particular function and nonspecific with respect to the current context; and
   executing relevant operations by a generic workflow functional module deployed on the workflow node of the workflow according to the matched context-aware logics, and generating a context-aware generic workflow application, wherein each of the generic workflow functional modules comprises generic logics for a specific function, which are applicable to multiple workflows and/or different contexts in a same workflow execution.

2. The method according to claim 1, wherein the context-aware logics include a set of context-aware conditions and corresponding context-aware actions, and executing relevant operations according to the matched context-aware logics comprises executing the corresponding context-aware actions according to the context-aware conditions matching the current context of the workflow execution in the matched context-aware logics.

3. The method according to claim 2, wherein each of the set of context-aware conditions is selected from the group consisting of:
   a generic workflow function;
   a workflow node;
   a user group;
   a work item type;
   a rule to be met for executing the context-aware actions; and
   combinations thereof.

4. The method according to claim 3, wherein the rule includes one of the following:
   a work item/workflow attribute name/attribute value pair; and
   a boolean expression about a work item/workflow attribute.

5. The method according to claim 2, wherein each of the set of corresponding context-aware actions is selected from the group consisting of:
   displaying a specific work item/workflow attribute in a user interface and the displaying manner thereof;
   processing a specific work item/workflow attribute and the processing manner thereof; and
   combinations thereof.

6. The method according to claim 1, further comprising:
   developing one or more generic workflow functional modules, and deploying the one or more generic workflow functional modules onto one or more workflow nodes of a workflow; and
   creating and storing the context-aware configuration data including context-aware logics.

7. A method for generating context-aware generic workflow applications, comprising:
   obtaining a current context of the workflow execution in response to an execution of a workflow on a workflow node;
   retrieving generic context-aware logics matching the current context from a stored context-aware configuration data including context-aware logics, the generic context-aware logics being specific to a particular function and nonspecific with respect to the current context, wherein the context-aware configuration data is stored in the form of a database table or a XML file; and
   executing relevant operations by a generic workflow functional module deployed on the workflow node of the workflow according to the matched context-aware logics, and generating a context-aware generic workflow application.

8. An apparatus for generating context-aware generic workflow applications, comprising:
   one or more generic workflow functional modules deployed onto one or more workflow nodes of a workflow;
   a context-aware configuration storage device configured to store generic context-aware configuration data including context-aware logics;
   a context obtaining module configured, in response to the execution of the workflow on a workflow node, to obtain the current context of the workflow execution;
   a context-aware logic management module configured to retrieve generic context-aware logics matching the current context in the context-aware configuration data stored in the context-aware configuration storage device, the generic context-aware logics being specific to a particular function and nonspecific with respect to the current context;
   wherein a relevant workflow functional module in the one or more generic workflow functional module is configured to execute relevant operations according to the matched context-aware logics, and generating a context-aware generic workflow application, wherein each of the one or more generic workflow functional modules comprises generic logics for a specific function, which are applicable to multiple workflows and/or different contexts in a same workflow execution.

9. The apparatus according to claim 8, wherein the context-aware logics includes a set of context-aware conditions and corresponding context-aware actions, and a relevant workflow functional module in the one or more generic workflow functional module is further configured to execute the corresponding context-aware actions according to the context-aware conditions matching the current context of the workflow execution in the matched context-aware logics.

10. The apparatus according to claim 9, wherein each of the set of context-aware conditions are selected from the group consisting of:
   a generic workflow function;
   a workflow node;
   a user group;
   a work item type;
   a rule to be met for executing the context-aware actions; and combinations thereof.

11. The apparatus according to claim 10, wherein the rule includes one of the following:
- a work item/workflow attribute name/attribute value pair; and
- a boolean expression about a work item/workflow attribute.

12. The apparatus according to claim 9, wherein each of the set of corresponding context-aware actions is selected from the group consisting of:
- displaying a specific work item/workflow attribute in a user interface and the displaying manner thereof;
- processing a specific work item/workflow attribute and the processing manner thereof; and
- combinations thereof.

13. An apparatus for generating context-aware generic workflow applications, comprising:
- one or more generic workflow functional modules deployed onto one or more workflow nodes of a workflow;
- a context-aware configuration storage device configured to store generic context-aware configuration data including context-aware logics;
- a context obtaining module configured, in response to the execution of the workflow on a workflow node, to obtain the current context of the workflow execution;
- a context-aware logic management module configured to retrieve generic context-aware logics matching the current context in the context-aware configuration data stored in the context-aware configuration storage device, the generic context-aware logics being specific to a particular function and nonspecific with respect to the current context, wherein the context-aware configuration data is stored in the form of a database table or XML file;
- wherein a relevant workflow functional module in the one or more generic workflow functional module is configured to execute relevant operations according to the matched context-aware logics, and generating a context-aware generic workflow application.

14. A computer program product comprising:
- a nontransitory computer recordable medium having computer usable program code for generating context-aware generic workflow applications comprising:
- computer usable program code configured for obtaining a current context of the workflow execution in response to an execution of a workflow on a workflow node;
- computer usable program code configured for retrieving generic context-aware logics matching the current context from a stored context-aware configuration data including context-aware logics, the generic context-aware logics being specific to a particular function and nonspecific with respect to the current context; and
- computer usable program code configured for executing relevant operations by a generic workflow functional module deployed on the workflow node of the workflow according to the matched context-aware logics, and generating a context-aware generic workflow application, wherein each of the one or more generic workflow functional modules comprises generic logics for a specific function, which are applicable to multiple workflows and/or different contexts in a same workflow execution.

15. The computer program product according to claim 14, wherein the context-aware logics include a set of context-aware conditions and corresponding context-aware actions, and executing relevant operations according to the matched context-aware logics comprises executing the corresponding context-aware actions according to the context-aware conditions matching the current context of the workflow execution in the matched context-aware logics.

16. The computer program product according to claim 15, wherein each of the set of context-aware conditions is selected from the group consisting of:
- a generic workflow function;
- a workflow node;
- a user group;
- a work item type;
- a rule to be met for executing the context-aware actions; and
- combinations thereof.

17. The computer program product according to claim 16, wherein the rule includes one of the following:
- a work item/workflow attribute name/attribute value pair; and
- a boolean expression about a work item/workflow attribute.

18. The computer program product according to claim 15, wherein each of the set of corresponding context-aware actions is selected from the group consisting of:
- computer usable program code configured for displaying a specific work item/workflow attribute in a user interface and the displaying manner thereof;
- computer usable program code configured for processing a specific work item/workflow attribute and the processing manner thereof; and
- combinations thereof.

19. The computer program product according to claim 14, further comprising:
- computer usable program code configured for developing one or more generic workflow functional modules, and deploying the one or more generic workflow functional modules onto one or more workflow nodes of a workflow; and
- computer usable program code configured for creating and storing the context-aware configuration data including context-aware logics.

20. A nontransitory computer readable storage medium storing instructions that, when executed by a computer, causes the computer to perform a method for generating context-aware generic workflow applications, the method comprising the steps of:
- obtaining a current context of the workflow execution in response to an execution of a workflow on a workflow node;
- retrieving generic context-aware logics matching the current context from a stored context-aware configuration data including context-aware logics, the generic context-aware logics being specific to a particular function and nonspecific with respect to the current context; and
- executing relevant operations by a generic workflow functional module deployed on the workflow node of the workflow according to the matched context-aware logics, and generating a context-aware generic workflow application, wherein each of the one or more generic workflow functional modules comprises generic logics for a specific function, which are applicable to multiple workflows and/or different contexts in a same workflow execution.

21. The computer readable storage medium according to claim 20, wherein the context-aware logics include a set of context-aware conditions and corresponding context-aware actions, and executing relevant operations according to the matched context-aware logics comprises executing the corresponding context-aware actions according to the context-aware conditions matching the current context of the workflow execution in the matched context-aware logics.

22. The computer readable storage medium according to claim 21, wherein each of the set of corresponding context-aware actions is selected from the group consisting of:
displaying a specific work item/workflow attribute in a user interface and the displaying manner thereof;
processing a specific work item/workflow attribute and the processing manner thereof; and
combinations thereof.

23. The computer readable storage medium according to claim 20, further comprising the steps of:
developing one or more generic workflow functional modules, and deploying the one or more generic workflow functional modules onto one or more workflow nodes of a workflow; and
creating and storing the context-aware configuration data including context-aware logics.

24. A computer program product comprising:
a nontransitory computer recordable medium having computer usable program code for generating context-aware generic workflow applications comprising:
computer usable program code configured for obtaining a current context of the workflow execution in response to an execution of a workflow on a workflow node;
computer usable program code configured for retrieving generic context-aware logics matching the current context from a stored context-aware configuration data including context-aware logics, the generic context-aware logics being specific to a particular function and nonspecific with respect to the current context, wherein the context-aware configuration data is stored in the form of a database table or a XML file; and
computer usable program code configured for executing relevant operations by a generic workflow functional module deployed on the workflow node of the workflow according to the matched context-aware logics, and generating a context-aware generic workflow application.

25. A nontransitory computer readable storage medium storing instructions that, when executed by a computer, causes the computer to perform a method for generating context-aware generic workflow applications, the method comprising the steps of:
obtaining a current context of the workflow execution in response to an execution of a workflow on a workflow node;
retrieving generic context-aware logics matching the current context from a stored context-aware configuration data including context-aware logics, the generic context-aware logics being specific to a particular function and nonspecific with respect to the current context, wherein the context-aware configuration data is stored in the form of a database table or a XML file; and
executing relevant operations by a generic workflow functional module deployed on the workflow node of the workflow according to the matched context-aware logics, and generating a context-aware generic workflow application.

* * * * *